United States Patent [19]

Delhaye et al.

[11] Patent Number: 4,886,248
[45] Date of Patent: Dec. 12, 1989

[54] RAPID EXTENSION SHOCK ABSORBER, IN PARTICULAR FOR CARRIER-BASED AIRCRAFT

[75] Inventors: Maurice Delhaye, GIF S/Yvette; Michel Derrien, Versailles; Jean-Luc Engerand, Sceaux, all of France

[73] Assignee: Messier-Hispano-Bugatti, Montrouge, France

[21] Appl. No.: 285,425

[22] Filed: Dec. 16, 1988

[30] Foreign Application Priority Data

Dec. 18, 1987 [FR] France ................ 87 17745

[51] Int. Cl.$^4$ ............ B64C 25/26; B64C 25/60
[52] U.S. Cl. .................. 267/64.26; 244/63; 244/104 FP; 267/127
[58] Field of Search ......... 244/102 R, 104 R, 104 FP, 244/63; 267/64.15, 64.16, 64.25, 64.26, 64.28, 127

[56] References Cited

U.S. PATENT DOCUMENTS

| | | | |
|---|---|---|---|
| 2,471,294 | 5/1989 | Watts | 267/64.26 |
| 2,735,634 | 2/1956 | Fosness | 244/104 FP |
| 2,735,674 | 2/1956 | Smith et al. | 244/104 FP |
| 3,062,485 | 11/1962 | Hartel | 244/63 |
| 3,743,222 | 3/1973 | Smith | 244/104 FP |
| 4,506,869 | 3/1985 | Masclef | 244/104 FP |
| 4,524,929 | 6/1985 | Gebhard | 244/63 |
| 4,529,180 | 7/1985 | Hill | 244/104 FP |
| 4,597,548 | 7/1986 | Bergloff et al. | 244/104 FP |
| 4,746,086 | 5/1988 | Happ | 244/63 |

FOREIGN PATENT DOCUMENTS 665399 9/1929 France .............. 267/64.25
887205 11/1943 France .

Primary Examiner—Galen Barefoot
Attorney, Agent, or Firm—Gerald J. Ferguson, Jr.

[57] ABSTRACT

A shock absorber comprising a strut (1), a sliding rod (3) mounted to slide inside the strut, at least one gas chamber (13, 17) under pressure, an oil chamber (6) associated with the gas chamber, and an expansion chamber (5) connected to the oil chamber via expansion throttling valve (8), the volume of the expansion chamber (5) varying as a function of the extent to which the sliding rod is received in the strut. The shock absorber also includes an expansion short circuit passage (18) between the oil chamber (6) and the expansion chamber (5), the expansion short circuit passage having a cross-section which is greater than the flow section of throttling valve (8), and the shock absorber includes controlled closure partition (32) for closing expansion short circuit passage (18).

9 Claims, 1 Drawing Sheet

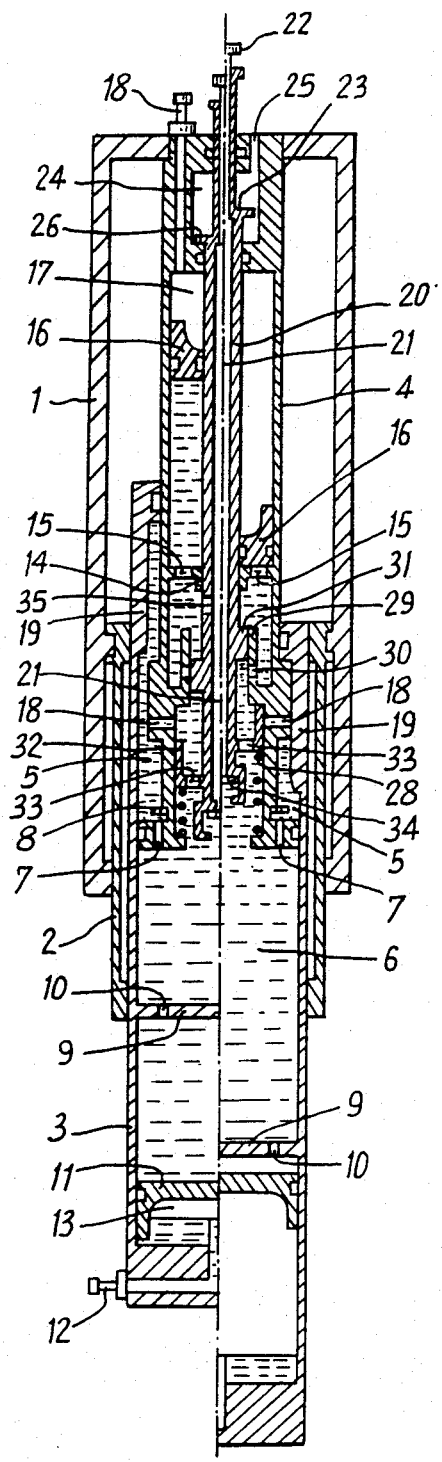

RAPID EXTENSION SHOCK ABSORBER, IN PARTICULAR FOR CARRIER-BASED AIRCRAFT

The present invention relates to a shock absorber intended more particularly for improving the performance of an aircraft on take-off, in particular during catapulting of an aircraft from an aircraft carrier.

BACKGROUND OF THE INVENTION

In order to reduce the take-off distance of an aircraft or to improve its take-off performance for a given take-off distance, it is necessary to impart a high vertical speed to the aircraft and to allow it to take up incidence rapidly. Vertical speed is obtained by extending the entire landing gear and the taking up of incidence is mainly related to the extension capacity of the nose landing gear. The extension must take place extremely quickly. In particular, when being catapulted, the nose landing gear must be capable of extending to raise the nose of the aircraft through several hundred millimeters in a very short period of time, about 0.15 seconds.

There exist devices for imparting a high vertical speed to an aircraft or to a portion thereof in order to facilitate very short take-off. Such devices are generally complex and additional to the normal equipment of the aircraft, thus increasing its weight.

Preferred embodiments of the present invention integrate the possibility of imparting high vertical speed to the aircraft or to a portion of the aircraft in one or more of its shock absorbers by providing shock absorbers capable of storing energy and of restituting said energy in a very short period of time.

SUMMARY OF THE INVENTION

The present invention provides a shock absorber comprising a strut, a sliding rod mounted to slide inside the strut, means for forming at least one gas chamber under pressure, an oil chamber associated with the gas chamber, and an expansion chamber connected to the oil chamber via expansion throttling means, the volume of the expansion chamber varying as a function of the extent to which the sliding rod is received in the strut; wherein the shock absorber includes an expansion short circuit passage provided between the oil chamber and the expansion chamber, the cross-section of said expansion short circuit passage being greater than the flow section of the throttling means, and wherein the shock absorber further includes controlled closure means for closing the expansion short circuit passage.

Thus, when the shock absorber has been compressed, opening the expansion short circuit passage of the expansion chamber allows the shock absorber to extend freely and thus imparts a large vertical speed to the aircraft as a whole if its various landing gear assemblies are equipped with shock absorbers in accordance with the invention, or merely imparting incidence very rapidly if only the nose landing gear is fitted with a shock absorber in accordance with the invention.

While still desiring to obtain rapid extension of the shock absorber, it may also be desirable to continue to provide the function of absorbing the oscillations to which the aircraft is subjected when its shock absorber is in the highly compressed position, said oscillations coming either from the surface state of the take-off deck, or else from inertia movements to which the aircraft is subjected.

In an advantageous version of the invention in combination with a shock absorber including a high pressure gas chamber and a low pressure gas chamber both of which are in communication with the oil chamber, high pressure throttling means are provided on a high pressure throttled passage between the oil chamber and the high pressure chamber. Thus, when the shock absorber is compressed, and the low pressure chamber is therefore at a pressure equal to that in the high pressure chamber, the throttling of the flow of oil between the oil chamber and the high pressure chamber serves to damp oscillations of the aircraft even when the short circuit expansion passage is open.

In a preferred aspect of the invention, the high pressure throttling means include a throttling non-return valve providing greater throttling when the sliding rod is being moved into the strut than when the shock absorber is extending. Oscillations are thus damped without disturbing the extension speed of the shock absorber.

In another advantageous aspect of the invention, the shock absorber includes calibrated orifices forming a passage in parallel with the high pressure throttling means, together with closure means for closing said calibrated orifices. The closure means for closing the high pressure throttled passage are preferably coupled with closure means for closing the high pressure calibrated orifices in order to act in alternation therewith, and the closure means for closing the high pressure calibrated orifices are preferably coupled with controlled closure means for closing the expansion short circuit passage of the expansion chamber in order to act in alternation therewith. In this way, shock absorbing conditions are adapted to the speed of expansion of the shock absorber.

In a preferred embodiment of the invention in combination with a shock absorber including a plunger rod rigidly fixed to the strut and extending inside the strut, said plunger rod having a wall which extends inside the sliding rod in order to form the expansion chamber, the expansion short circuit passage of the expansion chamber is made through the wall of the plunger rod and the controlled closure means for closing the expansion short circuit passage include a slider mounted to slide inside the plunger rod. Preferably, the high pressure gas chamber is contained inside the plunger rod, and the closure means for closing the high pressure throttled passage and the high pressure calibrated orifices are carried by the slider. Thus, the positions of the various closure means are easily controlled from outside the shock absorber by a control member imparting a single movement to the slider.

BRIEF DESCRIPTION OF THE DRAWINGS

An embodiment of the invention is described by way of example with reference to the accompanying drawing in which the sole FIGURE is an axial section view through a shock absorber in accordance with the invention with the lefthand side of the FIGURE showing the shock absorber in a compressed position, with the expansion short circuit passage being open, whereas the righthand side of the FIGURE shows the shock absorber in its extended position, with the expansion short circuit passage being closed.

MORE DETAILED DESCRIPTION

With reference to the FIGURE, the shock absorber comprises a strut 1 in which a rotary tube 2 is mounted and held in a fixed position longitudinally relative to the strut 1 while being free to rotate about a longitudinal axis of the strut 1. A sliding rod 3 is mounted to slide inside the rotary tube 2 and over a plunger rod 4 fixed to the strut 1. The facing portions of the sliding rod 3 and the plunger rod 4 delimit an annular expansion chamber 5 which is in communication with an oil chamber 6 inside the sliding rod 3 via a passage 7 which is associated with a throttling non-return valve 8.

The bottom of the sliding rod 3 has a transverse partition 9 pierced by calibrated orifices 10 and delimiting a low pressure chamber in which a low pressure piston 11 slides. Gas under pressure is inserted via a valve 12 into the volume 13 lying between the piston 11 and the bottom end of the sliding rod 3.

About halfway up the plunger rod 4, there is a transverse partition 14 pierced by orifices 15 and delimiting a high pressure chamber in which a high pressure piston 16 slides. The space 17 between the high pressure piston 16 and the top end of the plunger rod 4 is filled with gas under pressure inserted via a valve 18.

The portion of the wall of the plunger rod 4 which is common to the oil chamber 6 and to the expansion chamber 5 includes openings 18 forming an expansion short circuit passage between the expansion chamber 5 and the oil chamber 6. The top portion of the sliding rod 3 includes an inwardly projecting thickening 19 which, at the end of shock absorber expansion, automatically closes the openings 18 forming the expansion short circuit passage.

A slider 20 is mounted to slide coaxially with the plunger rod 4, with sealing being provided where it passes through the top partition of the plunger rod 4 and where it passes through the high pressure piston 16. The slider 20 is a hollow slider having a central duct 21 which is closed at its top end by a valve 22 used for filling the shock absorber with oil. Near its top end, the slider 20 includes a shoulder 23 surrounded by a control chamber 24 connected to a control orifice 25. Level with its shoulder 23, the slider 20 also includes an abutment flange 26. A return spring 28 is disposed at the bottom of the slider 20 and its bottom end bears against a bottom rim of the plunger rod while its top end bears against a facing portion of the slider 20.

The plunger rod 4 includes an annular partition 29 projecting inwardly between the transverse wall 14 and the bottom end of the plunger rod 4, with the annular partition 29 being pierced by calibrated high pressure orifices 30. The slider 20 includes a thickened zone 31 facing the annular partition 29 and serving when the slider is in a lowered position to close the orifices 30 and when the slider is in a raised position to open the calibrated orifices 30.

In the vicinity of its bottom end, the slider 20 includes an annular partition 32 having an outside diameter equal to the inside diameter of the facing portion of the plunger rod 4. The annular partition 32 is of appropriate height for closing the expansion short circuit passage 18 when the slider 20 is in its raised position and for opening said passage when the slider is in its lowered position. The annular partition 32 is connected to the central portion of the slider 20 by a transverse partition pierced by oil passages 33.

The bottom end of the central duct 21 through the slider 20 includes a compression throttling non-return valve 34. In the vicinity of the transverse partition 14 of the plunger rod 4, the slider 20 includes an oil passage 35 which is disengaged when the slider is in a lowered position and which is imprisoned in the thickness of the transverse partition 14 when the slider 20 is in a raised position.

The shock absorber of the invention is intended most particularly to be used as a nose wheel shock absorber in carrier-based aircraft. The operation of the shock absorber is now described in the context of this application. During catapulting, oil at a pressure greater than the pressure in the oil chamber 6 is admitted into the top control chamber 24 via the control orifice 25 and thrusts the slider 20 against the force exerted by the spring 28 and the pressure exerted on the slider 20 by the oil in the oil chamber 6 until the flange 26 comes into abutment against the bottom wall of the control chamber. When the slider is in this lowered position, the expansion short circuit passage 18 is disengaged, the high pressure calibrated orifices 30 are closed, and the oil passage 35 is disengaged. When the catapult bar is put under traction, the shock absorber is compressed and takes up the position shown in the lefthand half of the FIGURE. In this position, the low pressure gas chamber is substantially completely compressed and is thus at the same pressure as the high pressure chamber which is also highly compressed. During the initial stage of catapulting, the shock absorber remains compressed so long as the catapult bar is retained in the catapult slug. Under these conditions, if the shock absorber is additionally compressed due to oscillations of the aircraft structure, the volume of the expansion chamber 5 increases as the sliding rod 3 is pushed in. The oil from the oil chamber 6 then penetrates substantially freely into the expansion chamber 5 by passing through the oil passages 33 and the expansion short circuit passage 18. Simultaneously, the oil moves towards the high pressure gas chamber while being throttled as it passes through the throttling non-return valve 34. Compression of the shock absorber is thus braked by said throttling and excessive oscillations are thus avoided. With the slider 20 in this position, if the shock absorber expands slightly, the oil returns substantially freely from the expansion chamber 5 towards the oil chamber 6 by passing through the expansion short circuit passage 18 and through the passage 33. It also returns substantially freely from the high pressure chamber towards the oil chamber 6, with the non-return valve 34 being preferably fitted with a star of grooves (not shown) on its bottom face in order to ensure that it provides throttling only during compression of the shock absorber. When the catapult bar escapes from the catapult slug, the shock absorber expands suddendly under the effect of the sudden expansion of the gas chambers in the shock absorber. The oil in the expansion chamber 5 which normally slows down extension of the shock absorber now escapes freely from said chamber 5 via the short circuit passage 18 and therefore does not hinder extension. When the shock absorber reaches the end of its extension stroke, the inwardly projecting portion 19 of the wall of the sliding rod closes the short circuit passage 18 and the end of the extension stroke of the shock absorber therefore takes place at a slow speed by virtue of the throttling provided by the throttling non-return valve 18. This prevents the shock absorber from being damaged by too great a shock at the end of the extension stroke.

Prior to landing, the shock absorber is fully extended and is thus in the position shown in the righthand half of the FIGURE. In this position, the control orifice 25 is returned to the low pressure of the oil tank in the control circuit and the slider 20 therefore rises under the effect of the spring 28 and the pressure exerted on the slider 20 by the oil in the oil chamber 6. With the slider 20 in this raised position, the orifices 35 are imprisoned in the thickness of the transverse partition 14, the calibrated orifices 30 are disengaged, and the expansion short circuit passages 18 are closed both by the partition 32 and by the excess thickness 19 of the sliding rod. Under these conditions, during landing, the compression motion of the shock absorber is damped by the oil being throttled firstly as it passes through the calibrated orifices 10 associated with the low pressure chamber, and secondly, as it passes through the calibrated orifices 30 associated with the high pressure chamber. An expansion movement of the shock absorber is slowed down by the oil from the expansion chamber 5 being throttled as it passes through the throttling return valve 8. The shock absorber therefore performs its normal function of absorbing impact energy and of damping wheel oscillations.

Naturally, the invention is not limited to the embodiment described, and variant embodiments may be provided without going beyond the scope of the invention. In particular, although the shock absorber shown is a shock absorber for nose landing gear and is fitted with a rotating tube 2, an analogous structure may be used for the shock absorber of main landing gear, in which case the sliding rod 3 is directly mounted in the strut 1.

Likewise, the characteristics of the invention may be applied to a shock absorber including an expansion chamber lying between transverse partitions. If so desired, for whatever reason, the longitudinally displaceable slider 20 may be replaced by a rotary slider. In which case the above-described angular closure means are replaced by angular sectors in order to ensure that the corresponding passages are opened or closed as a function of the angular position of the slider.

We claim:

1. A shock absorber comprising a strut, a sliding rod mounted to slide inside the strut, means for forming at least one gas chamber under pressure, an oil chamber associated with the gas chamber, and an expansion chamber connected to the oil chamber via expansion throttling means, the volume of the expansion chamber varying as a function of the extent to which the sliding rod is received in the strut, wherein the shock absorber includes an expansion short circuit passage between the oil chamber and the expansion chamber, said expansion short circuit passage having a cross-section which is greater than the flow section of said expansion throttling means, and wherein the shock absorber further includes controlled closure means for closing the expansion short circuit passage.

2. A shock absorber according to claim 1, including a high pressure gas chamber and a low pressure gas chamber, with both gas chambers being in communication with the oil chamber, the shock absorber being wherein it includes high pressure throttling means on a high pressure throttled passage between the oil chamber and the high pressure chamber.

3. A shock absorber according to claim 2, wherein the high pressure throttling means include a throttling non-return valve providing greater throttling when the sliding rod is being moved into the strut than when the shock absorber is extending.

4. A shock absorber according to claim 2, including high pressure calibrated orifices forming a passage in parallel with the high pressure throttling means, and closure means for closing said high pressure calibrated orifices.

5. A shock absorber according to claim 4, including closure means for closing the high pressure throttled passage, said closure means being coupled with the closure means for closing the high pressure calibrated orifices in order to act in alternation therewith.

6. A shock absorber according to claim 4, wherein the closure means of the high pressure calibrated orifices and the controlled closure means of the expansion short circuit passage of the expansion chamber are coupled to act in alternation.

7. A shock absorber according to claim 1, including a plunger rod rigidly fixed to the strut and extending inside the strut, said plunger rod having a wall which extends inside the sliding rod in order to form the expansion chamber, wherein the expansion short circuit passage of the expansion chamber is made through the wall of the plunger rod, and wherein the controlled closure means for closing the expansion short circuit passage include a slider mounted to slide inside the plunger rod.

8. A shock absorber according to claim 7, wherein the sliding rod includes closure means for closing the expansion short circuit passage at the end of shock absorber expansion regardless of the position of the controlled closure means.

9. A shock absorber according to claim 7 including closure means for closing the high pressure throttled passage, said closure means being coupled with the closure means for closing the high pressure calibrated orifices in order to act in alternation therewith, and wherein the high pressure gas chamber is contained inside the plunger rod, and wherein the closure means for closing the high pressure throttled passage and the high pressure calibrated orifices are carried by the slider.

* * * * *